United States Patent [19]

George

[11] Patent Number: 4,920,177

[45] Date of Patent: Apr. 24, 1990

[54] ACCELERATED CURE OF THERMOPLASTIC COMPOSITIONS

[75] Inventor: Daniel E. George, Chadds Ford, Pa.

[73] Assignee: E. I. du Pont de Nemours and Company, Wilmington, Del.

[21] Appl. No.: 368,690

[22] Filed: Jun. 20, 1989

[51] Int. Cl.$^5$ ............ C08L 23/26; C08L 23/04; C08L 23/10; C08J 3/24

[52] U.S. Cl. ................. 525/195; 525/193; 525/208

[58] Field of Search ............... 525/193, 195, 208

[56] References Cited

U.S. PATENT DOCUMENTS

| | | | |
|---|---|---|---|
| 3,117,099 | 1/1964 | Proops et al. | 260/18 |
| 3,201,360 | 8/1965 | Proops et al. | 260/18 |
| 4,758,629 | 7/1988 | Deyrup et al. | 525/194 |

Primary Examiner—Carman J. Seccuro

[57] ABSTRACT

A process for accelerating the cure rate of a thermoplastic composition comprising blending 5–95 parts by weight of a crystalline polyolefin resin of a substantially saturated homopolymer or copolymer of a $C_2$–$C_8$ alpha monoolefin and 5–95 parts by weight of a crosslinkable ethylene-containing terpolymer comprising ethylene, an alkyl acrylate or alkyl methacrylate wherein the alkyl group contains 1–6 carbon atoms or a vinyl ester of a monocarboxylic acid having 2–6 carbon atoms, and glycidyl acrylate or glycidyl methacrylate, and mixing and shearing the composition while crosslinking the ethylene-containing terpolymer with a crosslinking agent that is a combination of (a) from about 1.5–9 parts by weight per 100 parts ethylene-containing terpolymer of an organic aliphatic or aromatic polycarboxylic acid or anhydride thereof containing 3–8 carbon atoms and (b) from about 0.3–8 parts by weight per 100 parts ethylene-containing terpolymer of a divalent tin halide salt or a stannous acylate having the formula

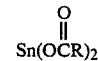

where R is an aliphatic hydrocarbyl radical having from 1–18 carbon atoms.

13 Claims, No Drawings

ACCELERATED CURE OF THERMOPLASTIC COMPOSITIONS

BACKGROUND OF THE INVENTION

This invention relates to an improved process for accelerating the cure rate of thermoplastic blends of polyolefins and ethylene-containing terpolymers.

Blends of plastics, for example, crystalline polypropylene, and ethylene/alkyl acrylate/glycidyl methacrylate terpolymers have been dynamically cured with polycarboxylic acids, such as adipic acid. Such cures produce thermoplastic compositions having excellent physical properties, however, the cure rate is very slow and, therefore, the process is economically unattractive due to the unduly long cure rates. It is also known that stannous octoate functions as a curative for the ethylene-containing terpolymers of the thermoplastic compositions described above and the rate of cure of the thermoplastic composition is fast. However, the physical properties, including tensile strength and compression set, are substantially detrimentally affected and, therefore, the usefulness of the composition is limited. There has been a need to increase the cure rate of the thermoplastic composition to make the process commercially attractive while, at the same time, maintaining the excellent physical properties of the composition obtained with curatives, such as adipic acid, that require rather excessive time periods for adequate cure.

SUMMARY OF THE INVENTION

The present invention is directed to a process for dynamically curing certain blends of a crystalline polyolefin resin and an ethylene-containing terpolymer elastomer with a combination of a crosslinking agent of an aliphatic polycarboxylic acid or anhydride thereof having at least two carboxylic acid groups or an anhydride group per molecule of acid, or an aromatic polycarboxylic acid or an anhydride thereof having at least two carboxylic groups or an anhydride group per aromatic nucleus and a stannous acylate or a divalent tin halide salt. More particularly, this invention relates to a process for accelerating the cure rate of a thermoplastic composition comprising blending 5-95 parts by weight of a crystalline polyolefin resin of a substantially saturated homopolymer or copolymer of a $C_2$-$C_8$ alpha monoolefin and 5-95 parts by weight of a crosslinkable ethylene-containing terpolymer comprising ethylene, an alkyl acrylate or alkyl methacrylate wherein the alkyl group contains 1-6 carbon atoms or a vinyl ester of a monocarboxylic acid having 2-6 carbon atoms, and glycidyl acrylate or glycidyl methacrylate, and mixing and shearing the composition while crosslinking the ethylene-containing terpolymer with a crosslinking agent that is a combination of (a) from about 1.5-9 parts by weight per 100 parts ethylene-containing terpolymer of an organic aliphatic or aromatic polycarboxylic acid or anhydride thereof containing 3-18 carbon atoms and (b) from about 0.3-8 parts by weight per 100 parts ethylene-containing terpolymer of a divalent tin halide salt or a stannous acylate having the formula

where R is a aliphatic hydrocarbyl radical having from 1-18 carbon atoms.

Preferably, the aliphatic or aromatic polycarboxylic acids or anhydrides thereof contain 4-9 carbon atoms, most preferably adipic acid, azelaic acid, phthalic acid and phthalic anhydride.

The divalent tin compounds that can be used in this invention are stannous acylates and tin halide salts. The stannous acylates used are divalent tin salts of aliphatic mono- or dicarboxylic acids which contain 1-18 carbon atoms, preferably 3-12 carbon atoms.

DETAILED DESCRIPTION OF THE INVENTION

The crystalline polyolefin resins used in the present invention are crystalline, substantially saturated homopolymers or copolymers of polymerized monomer units of $C_2$-$C_8$ alpha monoolefins. Representative alpha monoolefins include ethylene, propylene, butene, pentene, hexene, 2-methyl-1-propene, 3-methyl-1-pentene, 4-methyl-1-pentene, 5-methyl-1-hexene and mixtures thereof. Polyethylene, either high density, low density, or linear low density; polypropylene or copolymers of ethylene and propylene are especially preferred. The polyolefin resins are added to and are present in the composition in amounts of from about 5-95 parts by weight, preferably, 25-70 parts by weight.

The melt processible thermoplastic composition also contains 5-95 parts by weight, preferably, 30-75 parts by weight, of the ethylene-containing alkyl acrylate terpolymer. The ethylene-containing terpolymer comprises (1) ethylene, (2) a monomer selected from the group consisting of alkyl acrylates or alkyl methacrylates wherein the alkyl group contains 1-6 carbon atoms, or a vinyl ester of a monocarboxylic acid having 2-6 carbon atoms and (3) glycidyl acrylate or glycidyl methacrylate. The ethylene-containing terpolymer contains 30-90 weight percent ethylene units, preferably 35-80 weight percent; 8-70 weight percent, preferably 15-65 percent, units of alkyl acrylates or methacrylates or vinyl esters of monocarboxylic acids having 2-6 carbon atoms, e.g., n-butyl acrylate and vinyl acetate; and 0.5-20 weight percent, preferably 3-12 weight percent, units of glycidyl acrylate or glycidyl methacrylate. Representative alkyl acrylates and alkyl methacrylates that can be used in the ethylene-containing terpolymer are methyl acrylate, ethyl acrylate, propyl acrylate, isopropyl acrylate, n-butyl acrylate, isobutyl acrylate, pentyl acrylate, hexyl acrylate, methyl methacrylate, ethyl methacrylate, propyl methacrylate, butyl methacrylate and hexyl methacrylate. Normal butyl acrylate and ethyl acrylate are preferred alkyl acrylates because they result in thermoplastic compositions having superior low temperature properties. Representative vinyl esters include vinyl acetate, vinyl propionate, vinyl butyrates, and vinyl caproates. Vinyl acetate is preferred because such vinyl esters readily polymerize in the composition and they are commercially available.

The ethylene-containing copolymers that are used in the compositions of the present invention can be prepared by direct copolymerization, for example, by copolymerizing ethylene, an alkyl acrylate or vinyl ester, and glycidyl methacrylate or glycidyl acrylate in the presence of a free-radical polymerization initiator at elevated temperatures, preferably 100°-270° C., and most preferably 130°-230° C., and at elevated pressure, preferably at least 70 MPa, and most preferably 140-350

MPa. The most preferred ethylene-containing terpolymers that are used in the invention are copolymers of ethylene, n-butyl acrylate and glycidyl methacrylate.

Polycarboxylic acid crosslinking agents used in combination with the stannous acylate or tin halide salt for the ethylene-containing terpolymers include those aliphatic or aromatic acids having at least two reactive functional groups per molecule, and containing 3-18 preferably 4-9 carbon atoms. Usually, the polycarboxylic acids are aliphatic and, most preferably, aliphatic dicarboxylic acids. Representative examples of such aliphatic polycarboxylic acids include adipic, decandioic, dodecandioic, glutaric and azelaic acids, and anhydrides thereof, and unsaturated acids such as monoallyl itaconate and anhydrides thereof. Especially preferred is adipic acid because the resulting thermoplastic composition has good physical properties and adipic acid is readily available. Representative aromatic polycarboxylic acids include phthalic, terephthalic, isophthalic, pyromellitic, trimellitic, trimesic, hemimellitic, 1,8-naphthalenedicarboxylic acid, 1,2,4-benzenetricarboxylic acid and benzophenonetetracarboxylic acid and anhydrides thereof.

Stannous acylates having the formula

where R is an aliphatic hydrocarbyl radical of from 1-18 carbon atoms, preferably 4-9 carbon atoms, can be used as curatives with the aliphatic or aromatic polycarboxylic acids or anhydrides thereof disclosed above. Representative stannous acylates suitable for use as curatives with the polycarboxylic acid include stannous acetate, stannous propionate, stannous oxalate, stannous tartrate, stannous butyrate, stannous caproate, stannous valerate, stannous octoate, stannous laurate, stannous palmitate, stannous sterate and stannous oleate. Stannous octoate is preferred because it is readily available commercially.

Divalent tin halide salts can be used in the invention as curative components with the polycarboxylic acid. Tin chloride and tin iodide are preferred.

Stannous acylates can act independently as curing agents for thermoplastic compositions containing a polyolefin resin and an ethylene-containing terpolymer having glycidyl (meth)acrylate cure sites. However, compression set and oil swell, as well as the tensile strength of the thermoplastic compositions are inferior compared to those of similar compositions in which a polycarboxylic acid, such as adipic acid has been used to cure the composition. When a polycarboxylic acid is used alone as the curative, the cure rate is slow. However, when 1.5-9 parts by weight per hundred parts ethylene-containing terpolymer of a polycarboxylic acid or anhydride thereof is used in combination with 0.3-8 parts per hundred parts by weight ethylene-containing terpolymer of a stannous acylate or tin halide salt, thermoplastic compositions are obtained which have excellent tensile and tear strength, good compression set resistance, high elongation, and good oil resistance and, most importantly, the cure rate is substantially enhanced compared to those compositions in which only a polycarboxylic acid is used. The effect of the stannous salt is catalytic. That is, even at the lowest level, some acceleration takes place.

The particular amount of aliphatic or aromatic polycarboxylic acid or anhydride thereof and the specific amount of the stannous acylate or tin halide salt used to crosslink the thermoplastic elastomer is between from about 1.5-9 parts and from about 0.3-8 parts by weight per 100 parts ethylene-containing terpolymer, respectively. The precise amount used depends on the molecular weight of the polycarboxylic acid and the stannous acylate or tin salt. The higher the molecular weight of the polycarboxylic acid or the divalent tin compounds, the higher the concentration needed to obtain the optimum cure. For example, when adipic acid is used preferred amounts added to the curable composition are from about 1.5-3.0 parts per 100 parts ethylene-containing terpolymer. If oleic acid is used, the preferred amounts are about 4.5-9 parts per 100 parts ethylene-containing terpolymer. If azelaic acid is used the preferred amounts added to cure the composition are about 1.9-3.9 parts per 100 parts of the ethylene-containing terpolymer. When phthalic acid is added to cure the compositions, the preferred amounts are from 1.7-3.4 parts per 100 parts of the ethylene-containing terpolymer. Similarly, the higher the molecular weight of the tin compounds added to cure the composition, the higher the concentration of the compound. For example, when stannous octoate is added to cure the composition the preferred amounts are from about 0.3-8 parts per 100 parts ethylene-containing terpolymer. The various amounts that can be used with different polycarboxylic acids and tin compounds can be easily determined by one skilled in the art.

The multi-phase melt processible thermoplastic composition is prepared by mixing the crystalline polyolefin resin, the uncrosslinked ethylene-containing terpolymer and the crosslinking agents by any one of a number of well known procedures for mixing elastomers, for example, in an internal mixer, on a two-roll mill, or in an extruder. The mixing is performed at a temperature high enough to soften the polymers for adequate mixing, but not so high as to degrade the polymers. Generally, mixing is performed at temperatures of from about 100°-350° C., usually 150°-250° C. Crosslinking is conducted during mixing and shearing of the thermoplastic composition, i.e., dynamically crosslinking the ethylene-containing terpolymer. Mixing and shearing are carried out for a time sufficient to allow for crosslinking the ethylene-containing terpolymer and for comminuting the crosslinked ethylene-containing terpolymer. Adequacy of mixing can be determined by observing the processibility of the thermoplastic compositions by means of a piston rheometer.

In practice the stannous acylate or tin halide salt is usually added first and, after brief mixing, the polycarboxylic acid is added. If the addition sequence is reversed, or if the two are added simultaneously, the rate is enhanced to an even greater degree. However, this procedure can cause too rapid a reaction to attain adequate dispersion of the ethylene-containing terpolymer. While physical properties are essentially the same, the product from this reverse addition results in extrudates which have rough surfaces.

Although not essential, preferably, especially from a cost standpoint, various amounts of conventional fillers or compounding ingredients normally used with elastomers may be admixed with the thermoplastic compositions of this invention. Examples of such ingredients include processing oils, such as hydrocarbon extending oils, e.g. aromatic oils, paraffinic oils or naphthenic oils; fillers, such as various carbon blacks, clays, silica, alumina, calcium carbonate; pigments, such as titanium dioxide; antioxidants; stabilizers; flame retardants; smoke suppressants; processing aids such as lubricants and waxes; and plasticizers such as dialkyl phthalates, dialkyl adipates, dialkyl glutarates and trialkyl mellitates. It is preferable to add processing oils, plasticizers and fillers to the thermoplastic composition to improve its processing characteristics and the particular amounts used depend, at least in part, upon the quantities of other ingredients in the composition and the desired properties of the composition. The processing oils can be added before or after crosslinking has occurred.

TEST METHODS

The melt processible multiphase thermoplastic compositions prepared in the Examples were tested according to the following methods:
Tensile Strength at Break at 8.5 mm/s: ASTM D412
Modulus at 100% Elongation at 8.5 mm/s: ASTM D412
Elongation at Break at 8.5 mm/s: ASTM D412
Compression Set after 22 hr/100° C.; ASTM D395, Method B
Volume Swell in ASTM #3 Oil, 70 hrs/100° C.: ASTM D471
Shore Hardness: ASTM D2240

Tensile strength, modulus at 100% elongation, and elongation at break measurements were run on test specimens of approximately 1.9 mm in thickness. The specimens were non-standard dumbbells having the following dimensions using the standard ASTM D412 notation: A=13 mm, C=83 mm, L=44 mm, W=6.4 mm.

Compression set was measured on samples composed of 19 mm diameter discs died out of the 1.9 mm thick slabs which had been stacked to a thickness of approximately 13 mm.

Cure rate was determined by plotting the torque change for each sample as it was dynamically cured in a Haake System 90 internal mixer equipped with cam style blades. The Haake System 90 instrument gave instantaneous readings of the torque experienced in the mixer, and a print-out of the torque every 30 seconds. The time in minutes to maximum or constant torque after the addition of adipic acid was used as a measure of cure rate.

The following examples illustrate the best modes of the invention now contemplated.

EXAMPLES 1-6

A series of fully compounded melt processible multiphase thermoplastic compositions were prepared from "Profax" 6723 polypropylene (available from Himont, Inc.) having a density of 0.903 g/cm$^3$ and a melt flow rate of 0.8 dg/min, ethylene/n-butyl acrylate/glycidyl methacrylate terpolymer having a monomer ratio of 67 ethylene/28 n-butyl acrylate/5 glycidyl methacrylate and a melt flow rate of 13 dg/min (EBAGMA), ditridecyl adipate plasticizer (DTDA), the mixture of curatives, adipic acid and stannous octoate, clay filler, and "Sunpar" 2280 paraffinic oil. The materials employed and their relative proportions are given in Table I.

The procedure used to prepare the compositions was as follows. Polypropylene was placed in a 100 cc bowl of a Haake internal mixer equipped with cam style blades which was pre-heated to 200° C. The polypropylene was masticated at 100 rpm for two minutes to melt it. EBAGMA and tetrakis methylene(3,5-di-tert-butyl-4-hydroxyhydrocinnamate)-methane ("Irganox" 1010 antioxidant, available from Ciba-Geigy, Inc.) were added and the composition was mixed for three minutes. "Whitex" calcined Kaolin clay (dehydroxylated aluminum silicate), ditridecyl adipate plasticizer and "Sunpar" 2280 extender oil (a paraffinic oil, ASTM D2226 Type 104B, available from Sun Petroleum Marketing and Refining Co.) were then added in portions, alternating liquid and solid ingredients, followed by addition of one of the curative ingredients stannous octoate. After two minutes of further mastication the other curing agent, adipic acid, was added and mixing and mastication while curing was continued for an additional four minutes. The blend was removed from the mixer while hot, and after it had cooled to room temperature it was cut into smaller pieces and sheeted off a mill and molded into a 1.9 mm thick slab at 230° C. Test specimens died out of the slab were prepared and tested. Physical properties are shown in Table I.

TABLE I

|  | Ex. 1 | Ex. 2 | Ex. 3 | Ex. 4 | Ex. 5 | Ex. 6 | Comparative Ex. 7 |
| --- | --- | --- | --- | --- | --- | --- | --- |
| Polypropylene | 55 | 55 | 55 | 55 | 55 | 55 | 55 |
| EBAGMA | 45 | 45 | 45 | 45 | 45 | 45 | 45 |
| Ditridecyl Adipate | 25 | 25 | 25 | 25 | 25 | 25 | 25 |
| "Whitex" Clay | 17.5 | 17.5 | 17.5 | 17.5 | 17.5 | 17.5 | 17.5 |
| "Sunpar" 2280 Oil | 10 | 10 | 10 | 10 | 10 | 10 | 10 |
| "Irganox" 1010 | 0.5 | 0.5 | 0.5 | 0.5 | 0.5 | 0.5 | 0.5 |
| Adipic Acid | 1.2 | 1.3 | 1.3 | 1.3 | 0.83 | 0.72 | 1.2 |
| Stannous Octoate | 0.16 | 0.32 | 0.65 | 0.97 | 1.08 | 1.44 | — |
| Physical Properties |  |  |  |  |  |  |  |
| $M_{100}$, (MPa) | 8.9 | 9.3 | 9.1 | 9.0 | 8.6 | 8.4 | 9.1 |
| $T_B$, (MPa) | 11.6 | 12.9 | 13.2 | 13.2 | 11.1 | 10.6 | 11.8 |
| $E_B$, (%) | 260 | 270 | 290 | 315 | 280 | 260 | 280 |
| Shore D Hardness | 42 | 42 | 43 | 43 | 42 | 42 | 53 |
| Compression Set, (%) | 53 | 52 | 54 | 54 | 56 | 57 | 53 |
| Oil Swell, (%) | 47 | 42 | 46 | 48 | 52 | 57 | 47 |
| Cure Rate (Time to reach maximum or constant torque, minutes) | 3.5 | 3.0 | 2.0 | 1.5 | 2.5 | 2.0 | 5.5 |

The above examples show that with the combination of certain amounts of a polycarboxylic acid having two functional groups per molecule and a stannous acylate, the cure rate is shown to be substantially faster than that obtained with the acid alone as illustrated in the Comparative Example.

I claim:
1. A process for accelerating the cure rate of a thermoplastic composition comprising blending 5-95 parts by weight of a crystalline polyolefin resin of a substantially saturated homopolymer or copolymer of a $C_2$-$C_8$ alpha monoolefin and 5-95 parts by weight of a crosslinkable ethylene-containing terpolymer comprising ethylene, an alkyl acrylate or alkyl methacrylate wherein the alkyl group contains 1-6 carbon atoms or a vinyl ester of a monocarboxylic acid having 2-6 carbon atoms, and glycidyl acrylate or glycidyl methacrylate, and mixing and shearing the composition while crosslinking the ethylene-containing terpolymer with a crosslinking agent that is a combination of (a) from about 1.5-9 parts by weight per 100 parts ethylene-containing terpolymer of an organic aliphatic or aromatic polycarboxylic acid or anhydride thereof containing 3-18 carbon atoms and (b) from about 0.3-8 parts by weight per 100 parts ethylene-containing terpolymer of a divalent tin halide salt or a stannous acylate having the formula

where R is an aliphatic hydrocarbyl radical having from 1-18 carbon atoms.

2. A process of claim 1 wherein the aliphatic polycarboxylic acid or anhydride thereof contains 4-9 carbon atoms.

3. A process of claim 2 wherein the aliphatic polycarboxylic acid is adipic acid and is added in an amount of about 1.5-3.0 parts by weight per 100 parts ethylene-containing terpolymer.

4. A process of claim 1 wherein the aliphatic polycarboxylic acid is azelaic acid and is added in an amount of about 1.9-3.9 parts by weight per 100 parts ethylene-containing terpolymer.

5. A process of claim 1 wherein the aromatic polycarboxylic acid is phthalic acid or the anhydride thereof and is added in amount of about 1.7-3.4 parts by weight per 100 parts ethylene-containing terpolymer.

6. The process of claim 1 wherein the aliphatic hydrocarbyl radical of the stannous acylate contains 1-18 carbon atoms.

7. A process of claim 1 wherein the aliphatic hydrocarbyl radical of the stannous acylate contains 3-12 carbon atoms.

8. A process of claim 1 wherein the stannous acylate is stannous octoate and is added in amounts of about 0.30-3.5 parts by weight per 100 parts ethylene-containing terpolymer.

9. A process of claim 1 wherein the crystalline polyolefin is polypropylene.

10. A process of claim 1 wherein the aliphatic polycarboxylic acid is adipic acid and the stannous acylate is stannous octoate.

11. A process of claim 1 wherein the crosslinkable ethylene-containing terpolymer is ethylene, alkyl acrylate, and glycidyl acrylate or glycidyl methacrylate terpolymer.

12. A process of claim 11 wherein the alkyl acrylate is n-butyl acrylate.

13. A process of claim 12 wherein the polycarboxylic acid is adipic acid and the stannous acylate is stannous octoate.

* * * * *